(12) United States Patent
Izumi (10) Patent No.: US 12,275,301 B2
(45) Date of Patent: Apr. 15, 2025

(54) VEHICLE AND FUEL SUPPLY MODULE

(71) Applicant: KAWASAKI MOTORS, LTD., Hyogo (JP)

(72) Inventor: Kyohei Izumi, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 198 days.

(21) Appl. No.: 17/900,140

(22) Filed: Aug. 31, 2022

(65) Prior Publication Data

US 2024/0066978 A1 Feb. 29, 2024

(51) Int. Cl.
*B60K 15/07* (2006.01)
*B60K 15/03* (2006.01)

(52) U.S. Cl.
CPC ........ *B60K 15/07* (2013.01); *B60K 15/03006* (2013.01); *B60K 2015/03026* (2013.01); *B60K 2015/03421* (2013.01)

(58) Field of Classification Search
CPC .............. B60K 15/07; B60K 15/03006; B60K 2015/03026; B60K 2015/03421
See application file for complete search history.

(56) References Cited

U.S. PATENT DOCUMENTS

| | | | |
|---|---|---|---|
| 2004/0101745 A1* | 5/2004 | Kawasaki | B60L 50/71 429/96 |
| 2010/0025127 A1 | 2/2010 | Oyobe | |
| 2010/0116576 A1* | 5/2010 | Jufuku | B60K 1/04 180/68.5 |
| 2018/0283610 A1* | 10/2018 | Wexler | F17C 1/16 |
| 2022/0016973 A1* | 1/2022 | Mori | B60K 15/03 |

FOREIGN PATENT DOCUMENTS

| | | | | |
|---|---|---|---|---|
| CN | 104053940 A | * | 9/2014 | ....... B60K 15/03006 |
| WO | WO-2011114206 A1 | * | 9/2011 | ....... B60K 15/03006 |

* cited by examiner

*Primary Examiner* — Jacob M Amick
*Assistant Examiner* — Charles J Brauch
(74) *Attorney, Agent, or Firm* — Wenderoth, Lind & Ponack, L.L.P.

(57) ABSTRACT

A vehicle is driven by energy generated from a drive unit supplied with gas fuel, and includes a fuel supply module that includes a fuel tank in which the gas fuel is stored, a regulator that is connected to the fuel tank and adjusts the gas fuel output from the fuel tank to predetermined pressure, a fuel output port through which the gas fuel adjusted by the regulator is output, and a support that supports devices including the fuel tank, the regulator, and the fuel output port, and includes an attachment portion detachably attached to the vehicle while supporting the devices.

16 Claims, 7 Drawing Sheets

VEHICLE AND FUEL SUPPLY MODULE

BACKGROUND OF THE INVENTION

Technical Field

The present disclosure relates to a vehicle and a fuel supply module.

Related Art

US 2010/0025127 A1 discloses an automobile that obtains a driving force when hydrogen is supplied.

SUMMARY

Even in a vehicle using gas fuel such as hydrogen, it is desired to improve maintainability of each component of a fuel supply system.

An object of the present disclosure is to improve maintainability of a fuel supply system in a vehicle of a drive system using gas fuel.

One aspect of the present disclosure provides
a vehicle driven by energy generated from a drive unit supplied with gas fuel.
The vehicle includes a fuel supply module including
a fuel tank in which the gas fuel is stored,
a regulator that is connected to the fuel tank and adjusts the gas fuel output from the fuel tank to predetermined pressure,
a fuel output port through which the gas fuel adjusted by the regulator is output, and
a support that supports devices including the fuel tank, the regulator, and the fuel output port, and includes an attachment portion detachably attached to the vehicle while supporting the devices.

According to the present disclosure, in the vehicle, the fuel supply module can be detachably attached to the vehicle as a single body via the support. As a result, maintenance of a fuel supply system can be performed in a state of the fuel supply module, and maintainability of the fuel supply module can be improved.

BRIEF DESCRIPTION OF THE DRAWINGS

The foregoing and the other features of the present disclosure will become apparent from the following description and drawings of an illustrative embodiment of the disclosure in which.

DETAILED DESCRIPTION OF EMBODIMENTS

Hereinafter, a vehicle according to an embodiment of the present disclosure will be described with reference to the drawings. The same or corresponding elements are denoted by the same reference numerals throughout the drawings, and duplications of detailed description will be omitted. Directions are based on a direction viewed from a driver of a vehicle on a driver's seat, and a left-right direction corresponds to a width direction of the vehicle. In embodiments hereinafter, a case where the vehicle is a wheeled vehicle, particularly an irregular ground traveling vehicle will be described as an example. However, the present disclosure is also applicable to a vehicle other than an irregular ground traveling vehicle.

Figure 1:
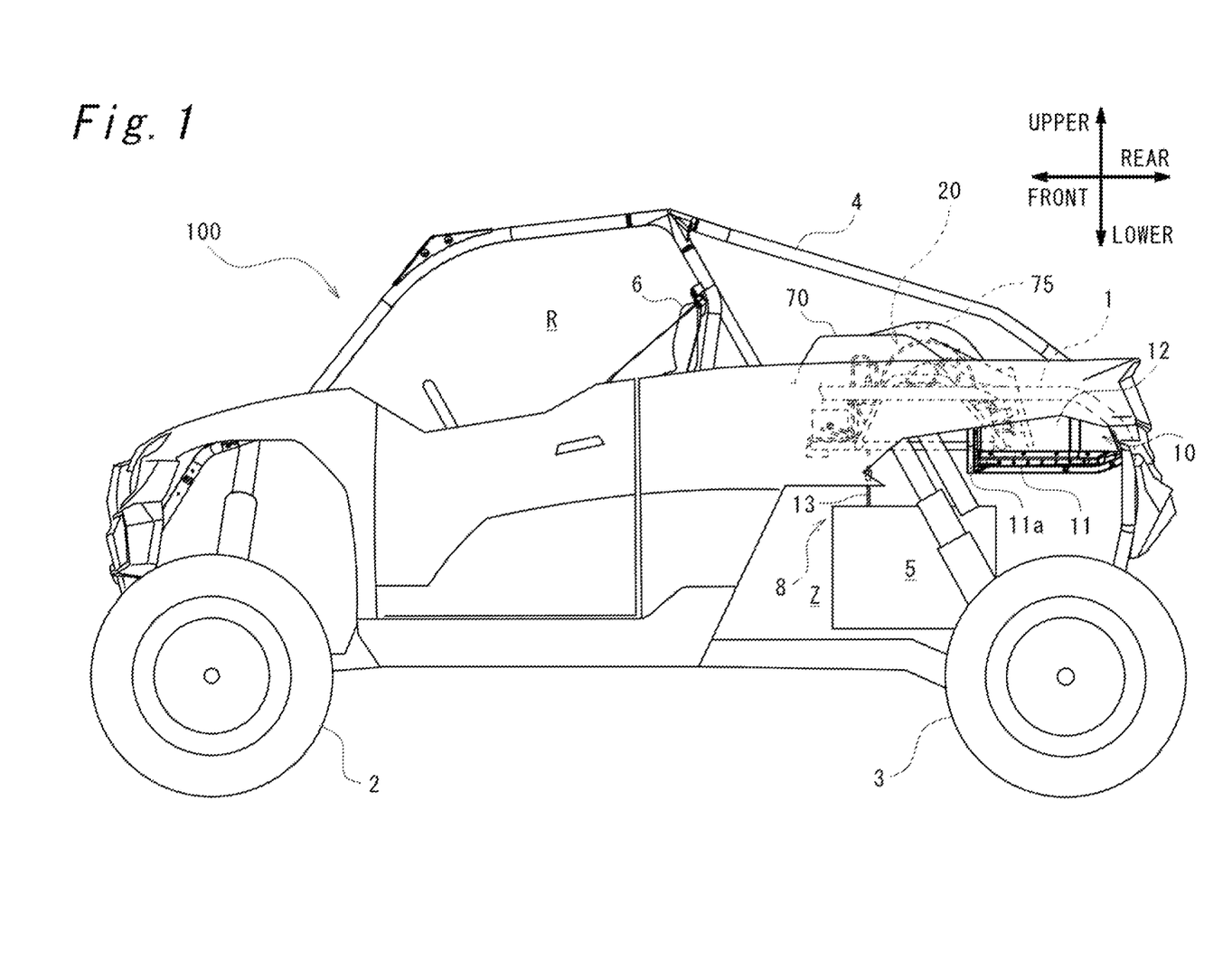
FIG. 1 is a left side view of a vehicle according to a first embodiment of the present disclosure.

FIG. 1 is a left side view of an irregular ground traveling vehicle 100 according to an embodiment of the present disclosure. As illustrated in FIG. 1, the irregular ground traveling vehicle 100 includes a vehicle body frame 1, left and right front wheels 2 arranged at a front end of the vehicle body frame 1, left and right rear wheels 3 arranged at a rear end of the vehicle body frame 1, a riding space R surrounded by a rollover protective structure (ROPS) 4, and a cargo bed 10 arranged on the rear side of the riding space R.

Figure 2:
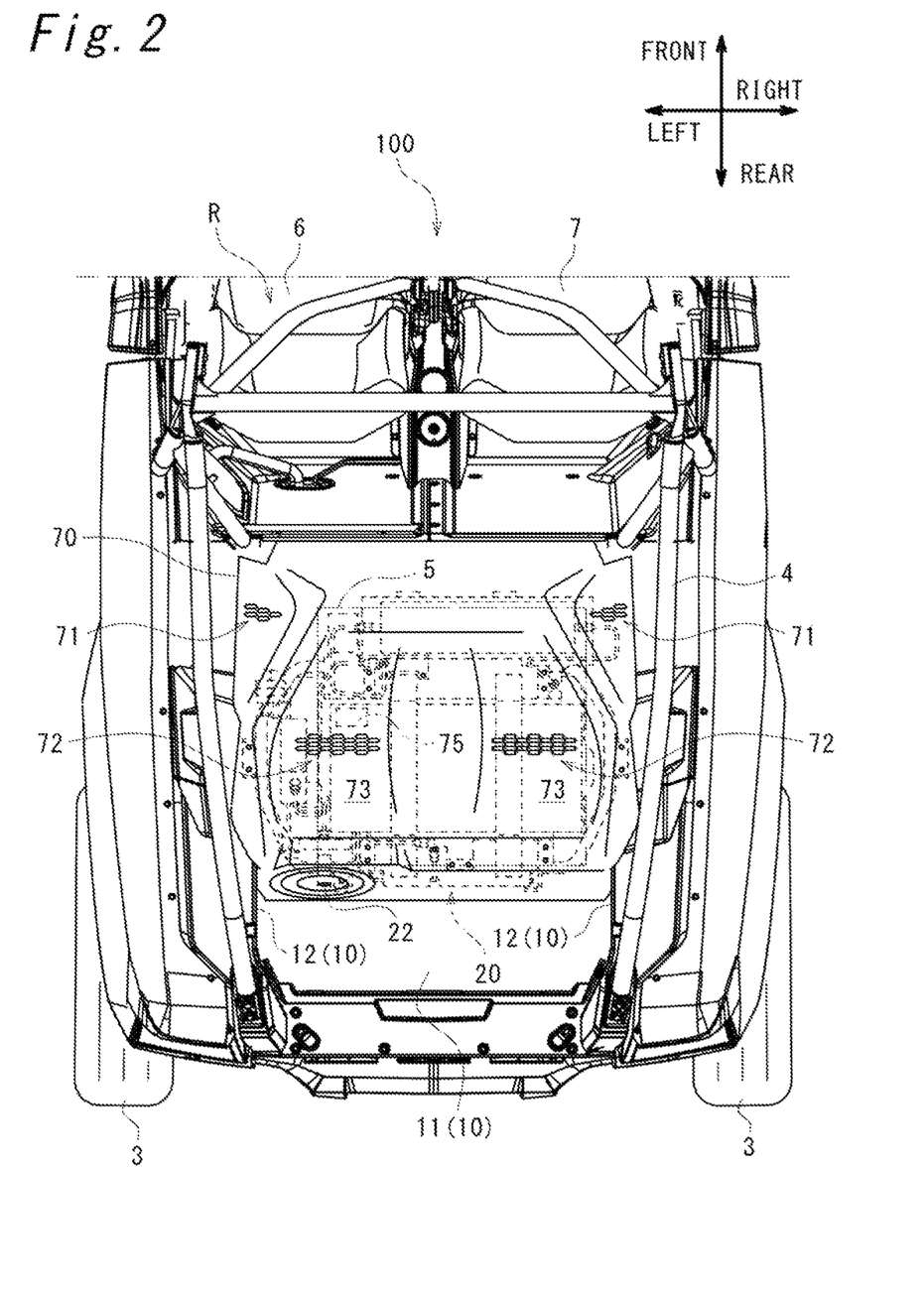
FIG. 2 is a plan view illustrating a portion around a cargo bed.

FIG. 2 is a plan view of the irregular ground traveling vehicle 100 illustrating a portion around the cargo bed 10. As illustrated in FIG. 2, the riding space R is provided with a driver's seat 6 located on the left side and a passenger's seat 7 located on the right side. The cargo bed 10 includes a bottom wall portion 11 extending in a front-rear direction and the left-right direction, and left and right side wall portions 12 extending upward from both left and right edge portions of the bottom wall portion 11. As illustrated in FIG. 1, the bottom wall portion 11 terminates at a position separated rearward from the riding space R and has a bottom wall front portion 11a. A power device space Z is defined behind the riding space R. The power device space Z extends rearward from a rear end of the riding space R to include the bottom wall front portion 11a of the cargo bed 10. A power device 8 that generates a driving force for traveling of the irregular ground traveling vehicle 100 is arranged in the power device space Z.

The power device 8 includes a drive unit 5 located at a lower side than the bottom wall portion 11 and a fuel supply module 20 located at a higher side than the bottom wall portion 11 in a vertical direction. The drive unit 5 generates a driving force for traveling of the irregular ground traveling vehicle 100. The fuel supply module 20 supplies gas fuel to the drive unit 5. The drive unit 5 and the fuel supply module 20 are disposed side by side in a vertical direction to face each other without a partition wall such as the cargo bed 10 interposed therebetween in the vertical direction except for a rear portion where the bottom wall front portion 11a is located.

The drive unit 5 generates a driving force, using gas fuel as fuel. As an example, the drive unit 5 may include an internal combustion engine that burns gas fuel to generate a driving force. As another example, the drive unit 5 may include a power generation unit that generates electric power using a gas fuel, and an electric motor that is rotationally driven by electric power generated by the power generation unit. The power generation unit may be a generator rotationally driven by mechanical energy generated by burning of gas fuel, or may be a fuel cell that extracts electric power from chemical energy of gas fuel.

Examples of the gas fuel include hydrogen fuel, natural gas containing methane or the like as a main component, and hydrocarbon gas containing propane, butane, or the like as a main component. Hereinafter, as a simple example, a case where the gas fuel is hydrogen fuel and the drive unit 5 includes a reciprocating hydrogen gas engine that generates a driving force by burning hydrogen fuel will be described.

As illustrated in FIG. 2, the power device space Z is further provided with a cover 70 that covers the fuel supply module 20 from above over the front-rear region thereof. In the present embodiment, the cover 70 is detachably fixed to the bottom wall portion 11 and a pair of the side wall portions 12 of the cargo bed 10 by a fastening bolt, but may be detachably fixed to the fuel supply module 20 by a fastening bolt. The cover 70 is formed with a plurality of first cover openings 71 located in both side portions closer to the front side and a plurality of second cover openings 72 located in both side portions in a substantially central portion in the front-rear direction. The first cover opening 71 and the second cover opening 72 penetrate the cover 70 in a thickness direction (vertical direction).

For example, a plurality of the first cover openings 71 located on the front side may be formed so as to open to the front side to constitute an outside air introduction port, and a plurality of the second cover openings 72 located on the rear side may be formed so as to open to the rear side to constitute an inside air discharge port. In this case, when the irregular ground traveling vehicle 100 travels, traveling wind (outside air) is taken into the cover 70 through a plurality of the first cover openings 71, and inside air in the cover 70 is discharged to the outside of the cover 70 through the second cover opening 72.

The first cover opening 71 and the second cover opening 72 may be formed in a louver shape that opens to the front side or the back side while opening to the vertical direction is restricted. This enables introduction of outside air into the cover 70 and discharge of inside air to the outside of the cover, while suppressing entry of a foreign matter (for example, rainwater, mud, sand, and the like) into the cover 70 from above.

A gas sensor 75 that detects gas fuel is arranged inside the cover 70. Preferably, the gas sensor 75 is arranged on a raised portion 73 raising upward on the cover 70. The raised portion 73 may be formed, for example, so as to be located above a tank inlet and outlet port 21a described later. Even if gas fuel leaks from the fuel supply module 20, the leaked gas fuel rises and tends to accumulate in the raised portion 73. Therefore, by arranging the gas sensor 75 on the raised portion 73, detectability of leaked gas fuel can be easily enhanced.

Figure 3:
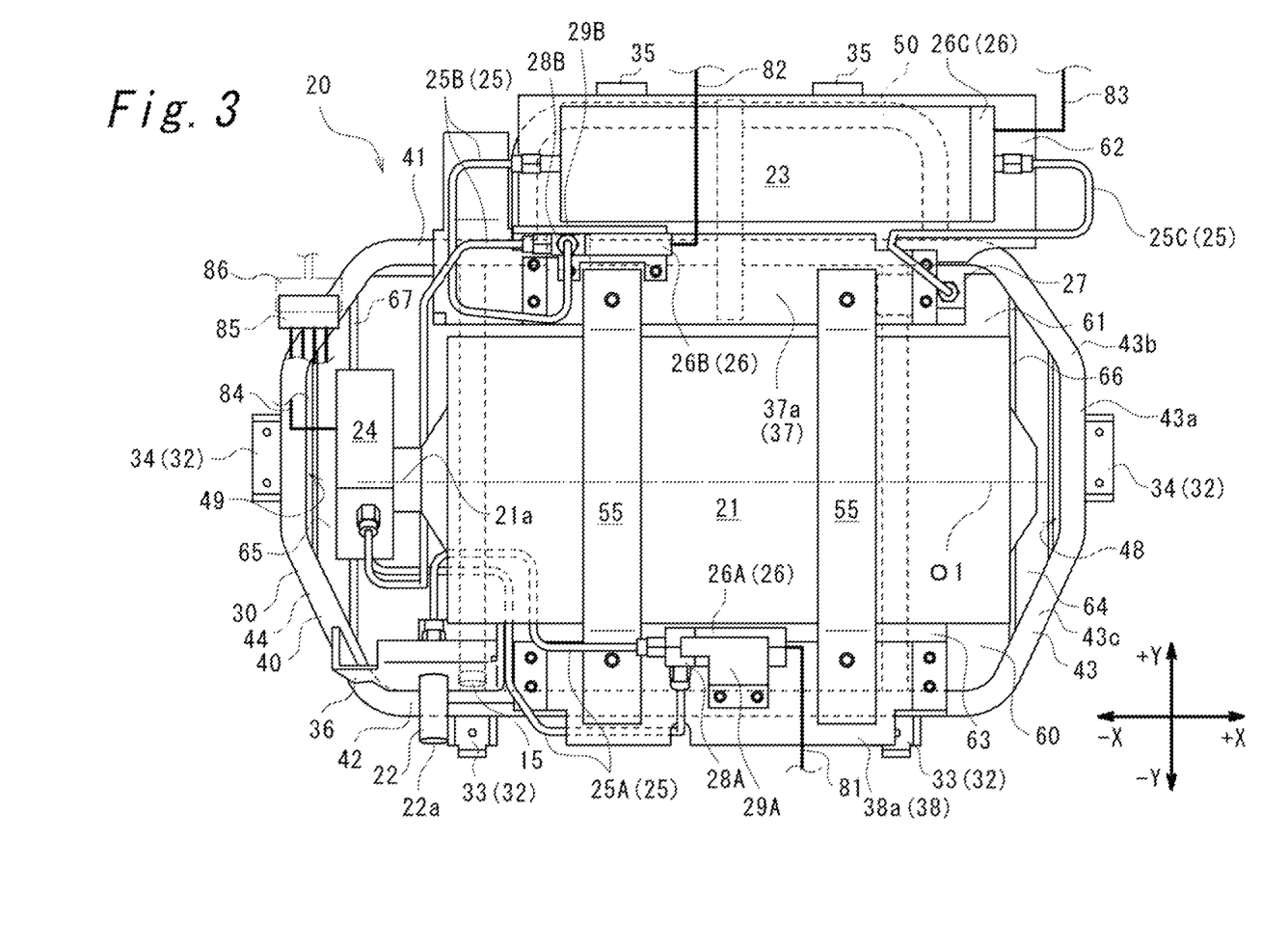
FIG. 3 is a plan view of a fuel supply module.

Hereinafter, the fuel supply module 20 will be described. FIG. 3 is a plan view of the fuel supply module 20. As illustrated in FIG. 3, the fuel supply module 20 includes a support 30, and a fuel tank 21, a fuel filler 22, a regulator 23, an on-off valve unit 24, a fuel pipe 25, a pressure sensor 26, and a fuel output port 27 supported on the support 30.

The fuel tank 21 is located at the center in the front-rear direction and the left-right direction in the fuel supply module 20. The fuel tank 21 is an elongated cylindrical body in which a central axis O1 extends in the left-right direction, and is configured to be able to store gas fuel inside. In the present embodiment, the fuel tank 21 is formed of resin whose outer surface is covered with carbon fiber reinforced plastic, and is configured to be able to store hydrogen gas fuel with maximum internal pressure of 70 MPa.

Hereinafter, in description of the fuel supply module 20 as a single body, a direction in which the central axis O1 of the fuel tank 21 extends is defined as an X direction, the vertical direction is defined as a Z direction, and a direction orthogonal to the X direction and the Z direction is defined as a Y direction. In the present embodiment, the fuel supply module 20 is mounted on the irregular ground traveling vehicle 100 in a posture in which the X direction is directed to a vehicle left and right direction, the Y direction is directed to a vehicle front and rear direction, and the Z direction is directed to a vehicle upper and lower direction. Further, regarding the fuel supply module 20, in FIG. 3, the right side is defined as a +X direction, the left side is defined as a −X direction, the upper side is defined as a +Y direction, and the lower side is defined as a −Y direction, and in FIG. 5, the upper side is defined as a +Z direction, and the lower side is defined as a −Z direction.

Figure 4:
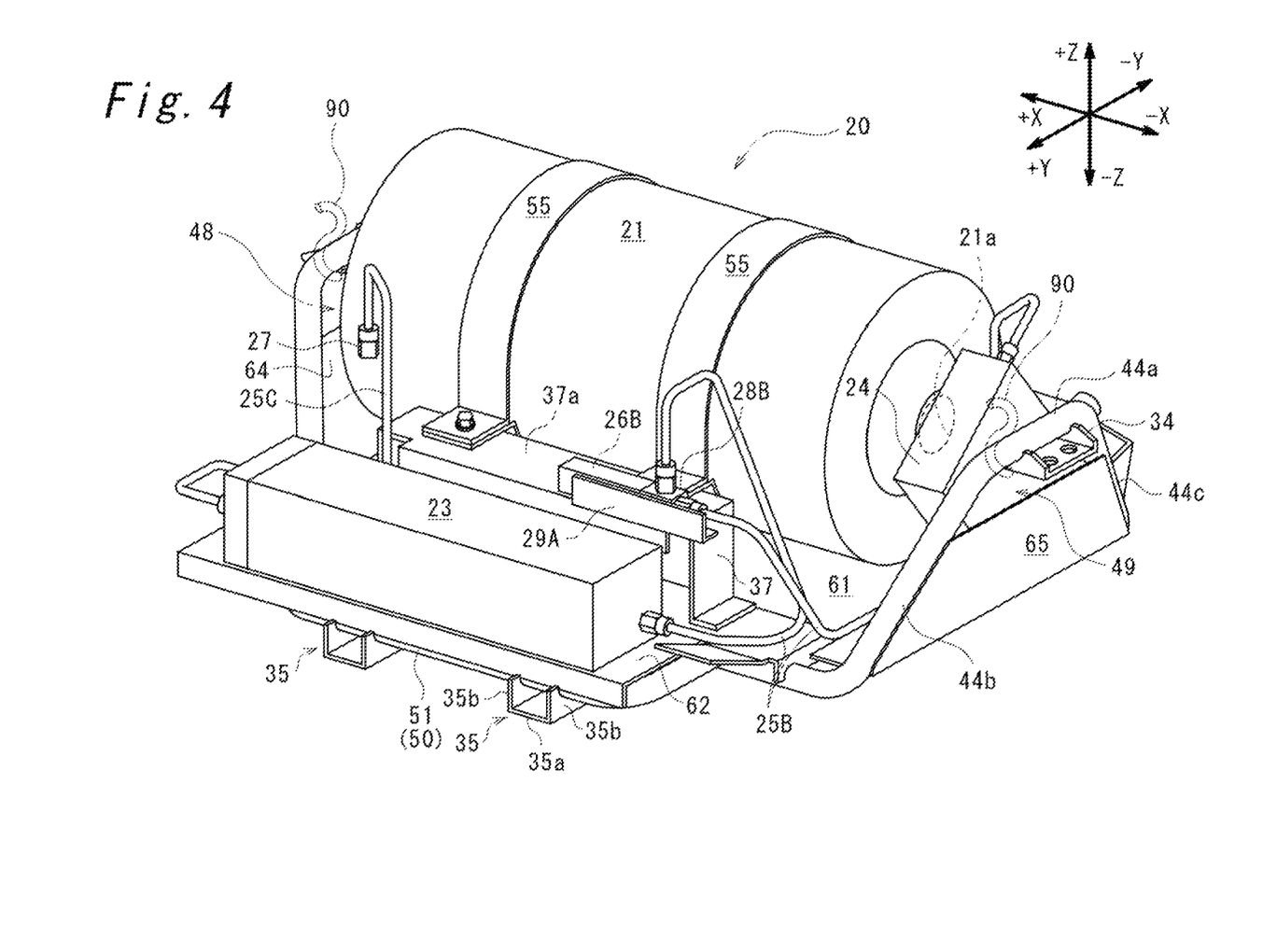
FIG. 4 is a perspective view of the fuel supply module as viewed from the front.

FIG. 4 is a perspective view of the fuel supply module 20 as viewed from the +Y side. As illustrated in FIG. 4, the fuel tank 21 has a tank inlet and outlet port 21a at the −X side end portion for allowing gas fuel to flow into the fuel tank 21 and/or allowing gas fuel to flow out of the fuel tank 21. In the present embodiment, the tank inlet and outlet port 21a serves as both an inlet port (tank inlet) and an outlet port (tank outlet), but the tank inlet and the tank outlet may be configured separately.

As illustrated in FIG. 3, in the fuel supply module 20, the fuel filler 22 is located in the −X side end portion on the −Y side of the fuel tank 21. In the present embodiment, the fuel filler 22 has a fuel filling port 22a configured to be connectable to a fuel filling device (not illustrated) installed in, for example, a hydrogen gas station on the road side outside the irregular ground traveling vehicle 100. The fuel supply module 20 is configured to be able to be supplied gas fuel from the fuel filling device via the fuel filler 22.

Note that, as indicated by a two-dot chain line in FIG. 3, a wireless communication device 15 may be attached near the fuel filler 22, and the fuel supply module 20 may be configured to be wirelessly communicable with the fuel filling device via the wireless communication device 15.

The regulator 23 is located on the +Y side of the fuel tank 21 in the fuel supply module 20. The regulator 23 adjusts pressure of gas fuel flowing out of the fuel tank 21 to constant pressure suitable for the drive unit 5 (see FIG. 1). For example, in the present embodiment, the regulator 23 adjusts pressure of gas fuel to 10 MPa.

The on-off valve unit 24 is attached to the tank inlet and outlet port 21a of the fuel tank 21. The on-off valve unit 24 is connected to the fuel filler 22 and the regulator 23 via the fuel pipe 25. The on-off valve unit 24 is an electromagnetic valve that is electronically controlled by an electronic control unit (ECU) 89 (see FIG. 7), and switches between a blocked state in which the tank inlet and outlet port 21a is blocked from the fuel filler 22 and the regulator 23, a filling state in which the tank inlet and outlet port 21a communicates with the fuel filler 22 to fill the fuel tank 21 with gas fuel, and an outflow state in which the tank inlet and outlet port 21a communicates with the regulator 23 to allow gas fuel to flow out.

The fuel pipe 25 includes a first fuel pipe 25A that connects the on-off valve unit 24 and the fuel filler 22, a second fuel pipe 25B that connects the on-off valve unit 24 and the regulator 23, and a third fuel pipe 25C that connects the regulator 23 and the fuel output port 27. A first manifold 28A is provided on the middle of the first fuel pipe 25A. A second manifold 28B is provided on the middle of the second fuel pipe 25B.

Figure 5:
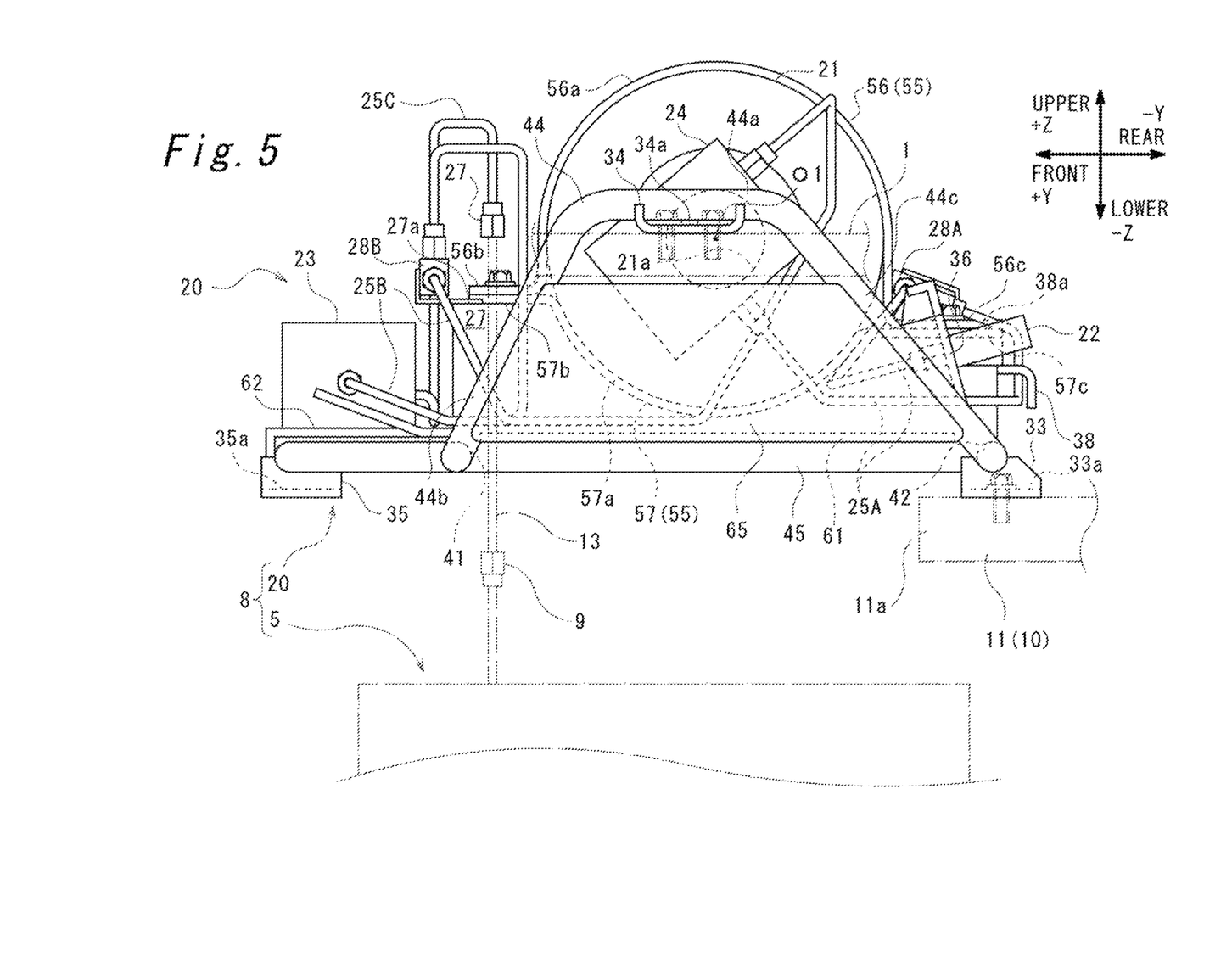
FIG. 5 is a left side view of the fuel supply module.

FIG. 5 is a side view of the fuel supply module 20 as viewed from the −X side. In FIG. 5, the drive unit 5 and the bottom wall portion 11 of the cargo bed 10 are also illustrated by a two-dot chain line in a state where the fuel supply module 20 is mounted on the irregular ground traveling vehicle 100. As illustrated in FIG. 5, the fuel output port 27 through which fuel gas whose pressure is adjusted by the regulator 23 is output is formed in a tip portion of the third fuel pipe 25C. The fuel output port 27 is configured to be connected to a fuel input port 9 on the drive unit 5 side via an intermediate fuel pipe 13.

As illustrated in FIG. 3, the pressure sensor 26 includes a first pressure sensor 26A that is provided in the first manifold 28A and measures pressure of gas fuel in the first fuel pipe 25A, a second pressure sensor 26B that is provided in the second manifold 28B and measures pressure of gas fuel in the second fuel pipe 25B, and a third pressure sensor 26C that is provided in the regulator 23 and measures pressure of gas fuel after the pressure is adjusted by the regulator 23. The third pressure sensor 26C may be provided in the third fuel pipe 25C via, for example, a manifold.

The first fuel pipe 25A may be provided with a check valve that allows inflow of gas fuel from the fuel filler 22 to the fuel tank 21 and prevents outflow of gas fuel in the opposite direction, that is, from the fuel tank 21 side to the fuel filler 22 side.

Figure 6:
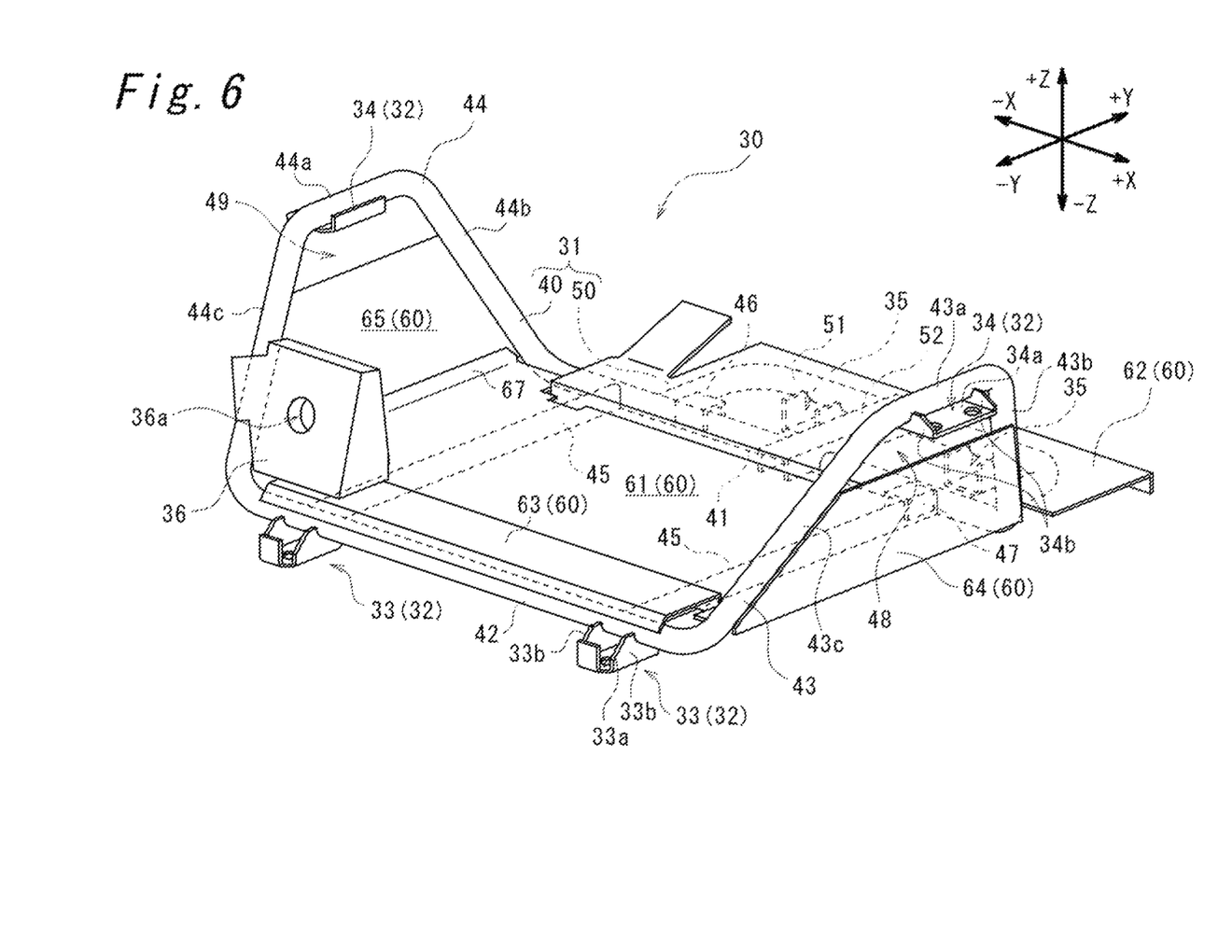
FIG. 6 is a perspective view of a support as viewed from the rear.

FIG. 6 is a perspective view of the support 30 as viewed from the −Y side. As illustrated in FIG. 6, the support 30 includes a support frame 31 constituting a framework and a support plate 60 attached to the support frame 31. The support frame 31 includes a main frame 40 surrounding a periphery of the fuel tank 21 (see FIG. 3) and a sub-frame 50 attached to the front side of the main frame 40 and located below the regulator 23 (see FIG. 3).

As illustrated in FIG. 3, the main frame 40 includes a first frame portion 41 located on the +Y side of the fuel tank 21, a second frame portion 42 located on the −Y side of the fuel tank 21, a third frame portion 43 located on the +X side of the fuel tank 21, and a fourth frame portion 44 located on the −X side of the fuel tank 21. In the present embodiment, one pipe having a round cross-sectional shape is bent to form the first to fourth frame portions 41 to 44, and both ends of the frame portions are joined by, for example, welding so that the main frame 40 is formed in a closed loop shape. Alternatively, the main frame 40 may be formed by joining a plurality of pipes by welding, for example.

As illustrated in FIG. 6, the first frame portion 41 and the second frame portion 42 extend in parallel to the X direction. In the first frame portion 41, a first pedestal portion 46 is joined to a portion located closer to the −X side by welding, for example. The first pedestal portion 46 has an attachment end surface which extends in parallel in the X direction and the Y direction on the +Z side and to which a first plate 62 described later is attached.

The third frame portion 43 connects the +X side ends of the first frame portion 41 and the second frame portion 42 in the Y direction. The fourth frame portion 44 connects the −X side ends of the first frame portion 41 and the second frame portion 42 in the Y direction. Referring to FIGS. 3 and 4, the third frame portion 43 extends linearly in a direction inclined to the +X side toward the +Z side when viewed from the Y direction. Similarly, the fourth frame portion 44 extends linearly in a direction inclined to the −X side toward the +Z side when viewed from the Y direction.

Referring to FIG. 5, the fourth frame portion 44 is formed in a trapezoidal shape protruding toward the +Z side when viewed from the −X side, in which the dimension in the Y direction gradually decreases toward the +Z side. The fourth frame portion 44 has a fourth frame upper portion 44a facing the fuel tank 21, particularly the tank inlet and outlet port 21a from the −X side, and extending parallel to the Y direction above the central axis O1 of the fuel tank 21. The fourth frame upper portion 44a has a +Y side end portion which is located further on the −Y side than a +Y side end portion of the fuel tank 21 and a −Y side end portion which is located further on the +Y side than a −Y side end portion of the fuel tank 21. The fourth frame upper portion 44a constitutes a guard portion against a foreign matter that may interfere or collide with the tank inlet and outlet port 21a from the −X side.

The fourth frame portion 44 includes a fourth frame first portion 44b that connects a +Y side end portion of the fourth frame upper portion 44a and a −X-side end portion of the first frame portion 41 and extends in a direction inclined to the −Y side toward the +Z side, and a fourth frame second portion 44c that connects a −Y side end portion of the fourth frame upper portion 44a and a −X side end portion of the second frame portion 42 and extends in a direction inclined to the +Y side toward the +Z side.

Similarly, referring to FIG. 3, the third frame portion 43 is formed in a trapezoidal shape protruding toward the +Z side when viewed from the +X side, in which the dimension in the Y direction gradually decreases toward the +Z side. The third frame portion 43 has a third frame upper portion 43a facing the fuel tank 21 from the +X side and extending parallel to the Y direction above the central axis O1 of the fuel tank 21. The third frame upper portion 43a has a +Y side end portion which is located further on the −Y side than a +Y side end portion of the fuel tank 21 and a −Y side end portion which is located further on the +Y side than a −Y side end portion of the fuel tank 21. The third frame portion 43 includes a third frame first portion 43b that connects a +Y side end portion of the third frame upper portion 43a and a +X-side end portion of the first frame portion 41 and extends in a direction inclined to the −Y side toward the +Z side, and a third frame second portion 43c that connects a −Y side end portion of the third frame upper portion 43a and a +X side end portion of the second frame portion 42 and extends in a direction inclined to the +Y side toward the +Z side.

As illustrated in FIG. 6, the main frame 40 further includes a pair of connecting frame portions 45 in the X direction that connects the first frame portion 41 and the second frame portion 42 in the Y direction at positions separated in the X direction by welding, for example. A pair of the connecting frame portions 45 extend parallel to the Y direction. A second pedestal portion 47 is attached to the connecting frame portion 45 located on the +X side of a pair of the connecting frame portions 45. The second pedestal portion 47 has on the +Z side an attachment end surface which extends in parallel in the X direction and the Y direction and to which the first plate 62 described later is attached.

The sub-frame 50 includes a first sub-frame portion 51 extending in an inverted U shape with an opening on the −Y side when viewed from the Z direction, and a second sub-frame portion 52 connected to a substantially central portion in the X direction of the first sub-frame portion 51 and extending to the −Y side beyond the first frame portion 41. Both end portions on the −Y side of the first sub-frame portion 51 are connected to the first frame portion 41 by welding, for example. A +Y-side end portion of the second sub-frame portion 52 is connected to the first sub-frame portion 51 by welding, for example, and is joined to the first frame portion 41 by welding, for example, at a portion intersecting the first frame portion 41.

The support plate 60 includes a base plate 61 facing the fuel tank 21 (see FIG. 3) from the −Z side and extending in the X direction and the Y direction, a first plate 62 located on the +Y side of the base plate 61, a second plate 63 located on the −Y side of the base plate 61, a third plate 64 located on the +X side of the base plate 61, and a fourth plate 65 located on the −X side of the base plate 61.

When viewed from the +Z side, the base plate 61 extends between the first frame portion 41 and the second frame portion 42 in parallel in the X direction and the Y direction, and is joined to a pair of the connecting frame portions 45 from the +Z side by welding, for example. As illustrated in FIG. 5, the base plate 61 is separated from the fuel tank 21 to the −Z side. That is, in a case where the drive unit 5 located below the fuel tank 21 is an internal combustion engine, the base plate 61 constitutes a heat insulator for heat radiated from the internal combustion engine to the fuel tank 21.

As illustrated in FIG. 6, the base plate 61 has a first flange 66 (see FIG. 3) that is bent to the +Z side at a +X side end portion and extends in a direction inclined to the +X side toward the +Z side, and has a second flange 67 that is bent to the +Z side at a −X side end portion and extends in a direction inclined to the −X side toward the +Z side.

The first plate 62 extends in the X direction and the Y direction so as to cover the sub-frame 50, the first frame portion 41, and +Y side end portions of a pair of the connecting frame portions 45 from the +Z side. The first plate 62 is joined to the main frame 40 from the +Z side by, for example, welding via the first pedestal portion 46 and the second pedestal portion 47, and is joined to the sub-frame 50 from the +Z side by, for example, welding in the second sub-frame portion 52.

The second plate 63 extends in the X direction and the Y direction so as to cover a −Y side end portion of a pair of the connecting frame portions 45 and the second frame portion 42 from the +Z side. The second plate 63 is joined to a pair of the connecting frame portions 45 and the second frame portion 42 from the +Z side by welding, for example.

The third plate 64 is formed in a trapezoidal shape in which an outer edge portion in the Y direction extends along the third frame portion 43 so as to cover, from the +X side, a portion surrounded in a trapezoidal shape by the third frame portion 43 when viewed from the +X side. That is, the third plate 64 extends along the +X side of the third frame portion 43, is inclined to the +X side toward the +Z side when viewed from the −Y side, and has a width in the Y direction gradually decreasing toward the +Z side when viewed from the +X side.

The third plate 64 constitutes a cover portion that covers the fuel tank 21 from the +X side. For example, the third plate 64 suppresses collision of foreign matters such as sand, water, and mud curled up by the front wheel 2 and/or the rear wheel 3 with the fuel tank 21 when the irregular ground traveling vehicle 100 travels, and protects the fuel tank against a collision object from the outside at the time of vehicle side impact.

Both edge portions of the third plate 64 in the Y direction are joined to portions excluding an upper portion of the third frame first portion 43b and the third frame second portion 43c from the +X side, for example, by welding, and has a −Z side end portion which is joined to the first flange 66 (see FIG. 3) of the base plate 61 from the +X side, for example, by welding. The third plate 64 is separated from the third frame upper portion 43a toward the −Z side, and is not attached to the third frame upper portion 43a. A first opening 48 having a trapezoidal shape opened in the X direction is formed between the third plate 64 and the third frame upper portion 43a. A hook 90 (indicated by a two-dot chain line in FIG. 4) can be engaged to the third frame upper portion 43a using the first opening 48. That is, the third frame upper portion 43a constitutes an engaged portion to which the hook 90 can be engaged.

Similarly, the fourth plate 65 is formed in a trapezoidal shape in which an outer edge portion in the Y direction extends along the fourth frame portion 44 so as to cover, from the −X side, a portion surrounded in a trapezoidal shape by the fourth frame portion 44 when viewed from the −X side. That is, the fourth plate 65 extends along the −X side of the fourth frame portion 44, is inclined to the −X side toward the +Z side when viewed from the −Y side, and has a width in the Y direction gradually decreasing toward the +Z side when viewed from the −X side.

The fourth plate 65 constitutes a cover portion that covers the fuel tank 21 and the on-off valve unit 24 from the −X side. For example, the fourth plate 65 suppresses collision of foreign matters such as sand, water, and mud curled up by the front wheel 2 and/or the rear wheel 3 with the fuel tank 21 when the irregular ground traveling vehicle 100 travels, and protects the fuel tank against a collision object from the outside at the time of vehicle side impact.

The fourth plate 65 is joined to portions excluding an upper portion of the fourth frame first portion 44b and the fourth frame second portion 44c from the −X side by, for example, welding, and has a −Z side end portion which is joined to the second flange 67 of the base plate 61 from the −X side by, for example, welding. The fourth plate 65 is separated from the fourth frame upper portion 44a toward the −Z side, and is not attached to the fourth frame upper portion 44a. A trapezoidal second opening 49 opened in the X direction is formed between the fourth plate 65 and the fourth frame upper portion 44a. The hook 90 (see FIG. 4) can be engaged to the fourth frame upper portion 44a using the second opening 49. That is, the fourth frame upper portion 44a constitutes an engaged portion to which the hook 90 can be engaged.

The support 30 further includes a filling unit support 36 that supports the fuel filler 22 (see FIG. 3) on the −X side and the −Y side. The filling unit support 36 is joined to the second plate 63 and the fourth frame second portion 44c by welding, for example. The filling unit support 36 is formed with a filling unit support hole 36a into which the fuel filler 22 is inserted in the Y direction.

To each of the second frame portion 42, the third frame upper portion 43a, and the fourth frame upper portion 44a of the main frame 40, a bracket 32 for fixing the support 30 to the irregular ground traveling vehicle 100 is joined, for example, by welding. The bracket 32 includes a pair of first attachment brackets 33 provided at both end portions in the X direction of the second frame portion 42, and a pair of second attachment brackets 34 attached to the third frame upper portion 43a and the fourth frame upper portion 44a.

The first attachment bracket 33 includes a first attachment seat bottom 33a extending parallel to the X direction and the Y direction in a manner protruding toward the −Y side further than the second frame portion 42, and a pair of first vertical wall portions 33b extending from both edge portions in the X direction of the first attachment seat bottom 33a toward the +Z side. The first attachment bracket 33 is joined to the second frame portion 42 in an upper edge portion of a pair of the first vertical wall portions 33b from the −Z side, for example, by welding.

The second attachment bracket 34 includes a second attaching seat bottom 34a extending in parallel to the X direction and the Y direction in a manner protruding to the outside of the main frame 40 in the X direction, and a pair of second vertical wall portions 34b extending from both edge portions of the second attaching seat bottom 34a in the Y direction toward the +Z side. The second attachment bracket 34 is joined to the third frame upper portion 43a or the fourth frame upper portion 44a in an upper edge portion of a pair of the second vertical wall portions 34b from the –Z side, for example, by welding.

As illustrated in FIG. 5, the fuel supply module 20 is detachably fixed to the bottom wall front portion 11a of the bottom wall portion 11 of the cargo bed 10 by a pair of the first attachment brackets 33 from the +Z side by, for example, a fastening bolt, and is detachably fixed to the vehicle body frame 1 supporting the side wall portion 12 (see FIG. 2) of the cargo bed 10 by a pair of the second attachment brackets 34 from the +Z side by, for example, a fastening bolt.

As illustrated in FIG. 4, a pair of mounting brackets 35 in the X direction are attached to the sub-frame 50 on the –Z side. The mounting bracket 35 includes a grounding portion 35a extending in the X direction and the Y direction on the –Z side of the first sub-frame portion 51, and a pair of vertical wall portions 35b extending from both edge portions in the X direction of the grounding portion 35a to the +Z side. The mounting bracket 35 is joined to the first sub-frame portion 51 at an upper edge portion of a pair of the vertical wall portions 35b from the –Z side, for example, by welding.

As illustrated in FIG. 5, the mounting bracket 35 is configured such that a height position in the Z direction of the grounding portion 35a is the same as a height position of the first attachment seat bottom 33a of the first attachment bracket 33. As a result, the fuel supply module 20 is grounded on a mounting surface such as a floor surface and a road surface at the first attachment seat bottom 33a of the first attachment bracket 33 and the grounding portion 35a of the mounting bracket 35 in a state of being detached from the irregular ground traveling vehicle 100, so that inclination in the X direction and the Y direction is suppressed and a posture in an in-vehicle state is maintained.

Next, attachment of each device of the fuel supply module 20 to the support 30 will be described. As illustrated in FIG. 3, the support 30 further includes a first support 37 located on the +Y side of the fuel tank 21 and a second support 38 located on the –Y side of the fuel tank 21.

As illustrated in FIG. 4, the first support 37 is a plate member formed to be bent so as to have a hat shape in which the –Z side is opened when viewed from the +Y side, and is detachably attached to the first plate 62 from the +Z side by, for example, a fastening bolt at a lower end portion. The first support 37 includes a first support wall portion 37a extending in parallel to the X direction and the Y direction further on the +Z side than the first plate 62. As illustrated in FIG. 5, the first support wall portion 37a is located further on the –Z side than the central axis O1 of the fuel tank 21.

Similarly, with reference to FIG. 3, the second support 38 is a plate member bent to have a hat shape with an opening on the –Z side when viewed from the –Y side, and is detachably attached to the second plate 63 from the +Z side by, for example, a fastening bolt at a lower end portion. The second support 38 is attached to the second plate 63, and has a second support wall portion 38a extending in the X direction and the Y direction further on the +Z side than the second plate 63. As illustrated in FIG. 5, the second support wall portion 38a is located further on the –Z side than the first support wall portion 37a.

As illustrated in FIG. 4, the support 30 further includes a clamp 55 that extends over the first support wall portion 37a and the second support wall portion 38a and holds the fuel tank 21. A pair of the clamps 55 are provided on both sides in the X direction. As illustrated in FIG. 5, the clamp 55 includes a first clamp 56 located on the +Z side and a second clamp 57 located on the –Z side.

The first clamp 56 includes a first arc portion 56a extending in a semicircular shape along a portion located on the +Z side of an outer periphery of the fuel tank 21, a first clamp first portion 56b extending to the +Y side along the first support wall portion 37a, and a first clamp second portion 56c extending to the –Y side along the second support wall portion 38a. The second clamp 57 includes a second arc portion 57a extending in a semicircular shape along a portion located on the –Z side of an outer periphery of the fuel tank 21, a second clamp first portion 57b extending to the +Y side along the first support wall portion 37a, and a second clamp second portion 57c extending to the –Y side along the second support wall portion 38a.

In a state of sandwiching the fuel tank 21 in the Z direction with the first arc portion 56a and the second arc portion 57a, the first clamp 56 and the second clamp 57 are fixed to the first support wall portion 37a from the +Z side by, for example, a fastening bolt with the first clamp first portion 56b and the second clamp first portion 57b placed on each other in the Z direction, and are fixed to the second support wall portion 38a from the +Z side by, for example, a fastening bolt with the first clamp second portion 56c and the second clamp second portion 57c placed on each other in the Z direction. In the fuel supply module 20, the fuel tank 21 is sandwiched by the clamp 55 and held at a position separated to the +Z side from the base plate 61.

The fuel filler 22 is inserted through the filling unit support hole 36a (see FIG. 6) in the Y direction, and is detachably attached to the filling unit support 36. Various attachment means can be employed for attaching the fuel filler 22 to the filling unit support 36. For example, a nut may be arranged from the +Y side of the filling unit support 36, and the fuel filler 22 may be detachably fixed to the filling unit support 36 in a manner that the filling unit support 36 is sandwiched in the Y direction between the nut and the fuel filler 22.

The regulator 23 is attached to the first plate 62 from the +Z side. Various attachment means can be employed to attach the regulator 23 to the first plate 62. For example, the regulator 23 may be detachably fixed to the first plate 62 by a fastening bolt.

As illustrated in FIG. 3, the second manifold 28B and the second pressure sensor 26B are detachably attached to the first support wall portion 37a via a second sensor bracket 29B by, for example, a fastening bolt. The first manifold 28A and the first pressure sensor 26A are detachably attached to the second support wall portion 38a via a first sensor bracket 29A by, for example, a fastening bolt.

First to third electric harnesses 81 to 83 are connected to the first to third pressure sensors 26A to 26C, respectively. Drive voltage is input to each of the first to third pressure sensors 26A to 26C via the first to third electric harnesses 81 to 83, and an electric signal based on a detection result is output from each of the first to third pressure sensors 26A to 26C. Further, a fourth electric harness 84 is connected to the on-off valve unit 24. Drive voltage is input to the on-off valve unit 24 via the fourth electric harness 84.

The first to fourth electric harnesses 81 to 84 are gathered in one module-side connector 85. The module-side connector 85 is supported by the support 30 and is configured to be connected to a vehicle-body-side connector 86 indicated by a two-dot chain line in FIG. 3. In the present embodiment, the module-side connector 85 is located on the side where the fuel output port 27 is arranged with respect to the fuel tank 21, that is, on the +Y side. The module-side connector 85 is supported by the main frame 40.

In the present embodiment, an electric signal output from the first to third pressure sensors 26A to 26C are input to the ECU 89 provided in the irregular ground traveling vehicle 100 via the vehicle-body-side connector 86. Further, drive voltage output via the ECU 89 is applied to the first to third pressure sensors 26A to 26C and is also applied to the on-off valve unit 24, and operation of the first to third pressure sensors 26A to 26C and the on-off valve unit 24 is controlled.

Figure 7:
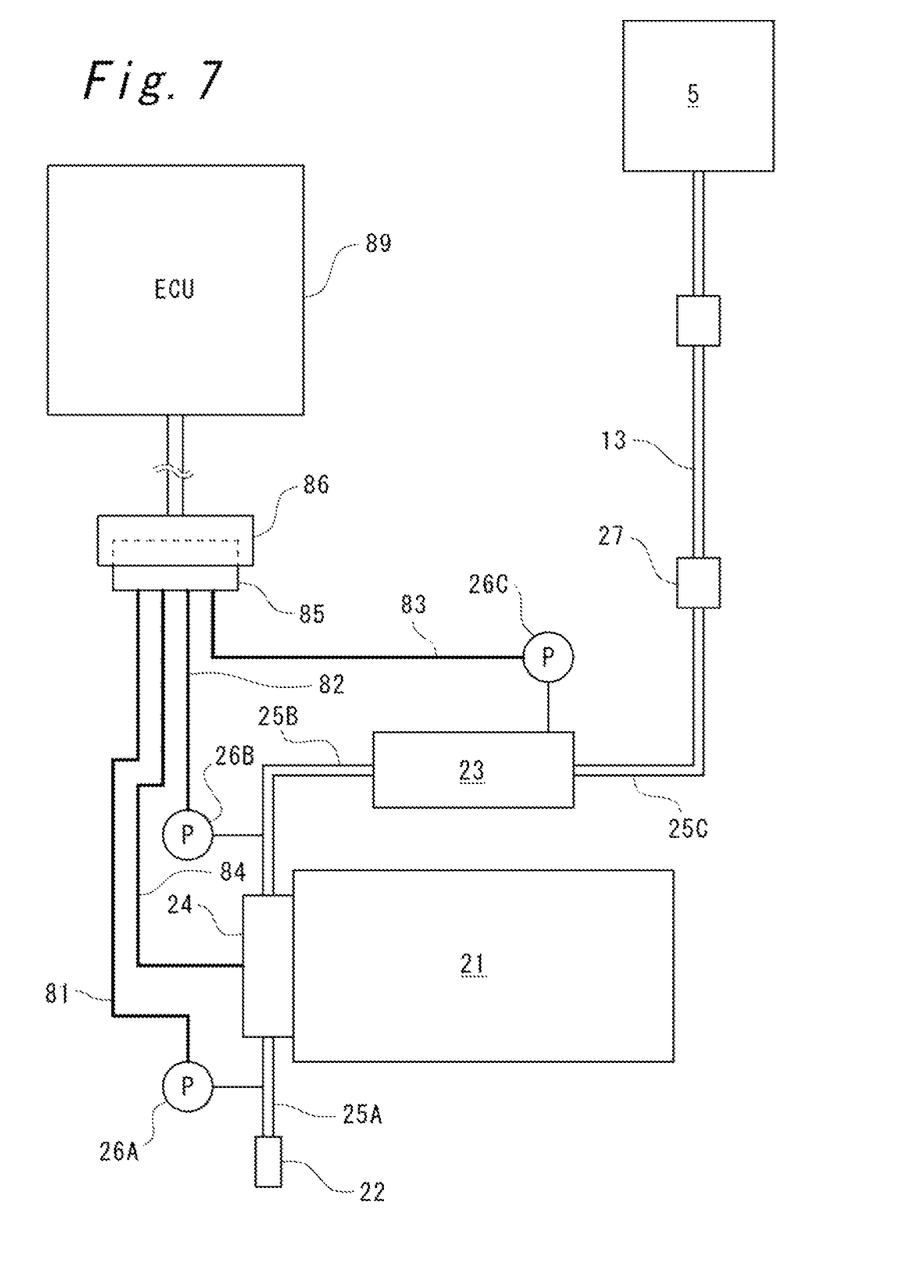
FIG. 7 is a block diagram illustrating a schematic configuration of the fuel supply module.

FIG. 7 is a block diagram schematically illustrating a schematic configuration of the fuel supply module 20. As illustrated in FIG. 7, pressure of gas fuel in the first fuel pipe 25A is detected by the first pressure sensor 26A. For example, when the on-off valve unit 24 causes the fuel tank 21 and the fuel filler 22 to communicate with each other, the ECU 89 can estimate a remaining amount of gas fuel in the fuel tank 21 when filling with gas fuel is performed based on pressure of gas fuel detected by the first pressure sensor 26A.

The second pressure sensor 26B detects pressure of gas fuel in the second fuel pipe 25B. For example, when the on-off valve unit 24 causes the fuel tank 21 and the regulator 23 to communicate with each other, the ECU 89 can estimate a remaining amount of gas fuel in the fuel tank 21 when gas fuel is discharged from the fuel tank 21 to the regulator 23 side based on pressure of gas fuel detected by the second pressure sensor 26B.

The third pressure sensor 26C detects pressure of gas fuel in the third fuel pipe 25C. For example, when the on-off valve unit 24 causes the fuel tank 21 and the regulator 23 to communicate with each other, the ECU 89 can check whether the regulator 23 properly adjusts pressure of gas fuel based on pressure of gas fuel detected by the third pressure sensor 26C.

The irregular ground traveling vehicle 100 according to the embodiment described above has an effect described below.

(1) The irregular ground traveling vehicle 100 is driven by energy generated from the drive unit 5 supplied with gas fuel, and includes the fuel supply module 20 that includes the fuel tank 21 in which gas fuel is stored, the regulator 23 that is connected to the fuel tank 21 and adjusts gas fuel output from the fuel tank 21 to predetermined pressure, the fuel output port 27 through which gas fuel adjusted by the regulator 23 is output, and the support 30 that supports devices including the fuel tank 21, the regulator 23, and the fuel output port 27, and includes the first attachment bracket 33 and the second attachment bracket 34 which are the attachment portions detachably attached to the irregular ground traveling vehicle 100 while supporting the devices.

As a result, in the irregular ground traveling vehicle 100, the fuel supply module 20 can be detachably attached to the irregular ground traveling vehicle 100 as a single body via the support 30. Therefore, maintenance can be performed in a state of the fuel supply module, and maintainability can be improved as compared with a case where maintenance is performed in a state where the fuel supply module is mounted on a vehicle.

Further, since the fuel supply module 20 is mounted with most of a fuel supply system, that is, in the present embodiment, a high pressure fuel supply portion in which high pressure gas fuel (in the present embodiment, at about 70 MPa at the maximum) before being decompressed by the regulator 23 is stored and circulated, such as the fuel tank 21, the fuel filler 22, the regulator 23, the on-off valve unit 25, the first and second fuel pipes 25A and 25B, and the first and second pressure sensors 26A and 26B, it is possible to perform leak test of gas fuel in the fuel supply system in a state of being a single body not mounted on the irregular ground traveling vehicle 100 and maintainability can be improved. Further, in a state of the fuel supply module 20 as a single body, for example, part replacement or the like can be easily performed in addition to leak test, and workability in various maintenance of the fuel supply system can be improved.

Furthermore, by removing the fuel supply module 20 as a single body, it is easy to access to a desired maintenance location, for example, the drive unit 5, located below the fuel supply module 20 without partially removing the fuel supply system.

(2) The fuel supply module 20 further includes the support plate 60 constituting a heat insulator for the drive unit 5 which is a heat source around thereof.

As a result, the support plate 60 can suppress influence of heat from the drive unit 5, which is a heat source around thereof, on the fuel supply module 20.

(3) The base plate 61 is away from the fuel tank 21 to the −Z side.

As a result, in a case where the base plate 61 is configured as a heat insulator, an air layer is formed between the base plate 61 and the fuel tank 21, so that temperature increase of the fuel tank 21 can be suppressed.

(4) The fuel supply module 20 further includes the first to third pressure sensors 26A to 26C and the on-off valve unit 24, which are electrical components for electronically controlling operation of the fuel supply module 20, and the module-side connector 85 for electrically connecting the electrical components to the irregular ground traveling vehicle 100, and the electrical components and the module-side connector are supported by the support 30.

As a result, when the fuel supply module 20 is attached to and detached from the irregular ground traveling vehicle 100, the electrical components can be easily connected to and detached from the vehicle-body-side connector 86 via the module-side connector 85.

(5) The module-side connector 85 is located on the side where the fuel output port 27 is arranged with respect to the fuel tank 21, that is, on the +Y side in the present embodiment.

As a result, when the fuel supply module 20 is attached to and detached from the irregular ground traveling vehicle 100, connection and detachment work of the fuel output port 27 to and from the vehicle body side and connection and detachment work of the electrical component to and from the vehicle body side can be performed in order, since they are located on the same side with respect to the fuel tank 21.

(6) The fuel supply module 20 further includes the fuel filler 22 connected to the fuel tank 21 and to which gas fuel is supplied, and the fuel filler 22 is located on the side opposite to the regulator 23 with respect to the fuel tank 21, that is, on the −Y side in the present embodiment.

As a result, the fuel filler 22 and the regulator 23 can be arranged separately around the fuel tank 21. As a result, it is easy to suppress interference with a tool or the like for attaching and detaching these components at the time of maintenance of them, and it is easy to ensure maintainability.

(7) The fuel tank 21 includes the tank inlet and outlet port 21a through which gas fuel is supplied and/or output, and the support 30 has the fourth frame portion 44 and the fourth plate 65 which are cover portions covering the tank inlet and outlet port 21a.

As a result, the tank inlet and outlet port 21a of the fuel tank 21 is easily protected by being covered by the fourth frame portion 44 and the fourth plate 65 which are cover portions.

(8) In the support 30, an engaged portion with which the hook 90 for lifting the support 30 can be engaged is formed on the third frame upper portion 43a and the fourth frame upper portion 44a.

As a result, the fuel supply module 20 can be easily lifted up together with the support 30 by engaging the hook 90 with the engaged portion, so that the detachability of the fuel supply module 20 with respect to the irregular ground traveling vehicle 100 can be easily improved.

(9) The fuel supply module 20 further includes the cover 70 covering the fuel supply module 20 from above.

As a result, collision of a foreign matter with the fuel supply module 20 from above is suppressed by the cover 70.

(10) The cover 70 includes the first cover opening 71 configured as an outside air introduction port for introducing outside air into the cover 70, and the second cover opening 72 configured as an inside air discharge port for discharging inside air in the cover 70 to the outside.

As a result, inside air in the cover 70 can be discharged to the outside of the cover 70 through the second cover opening 72 which is an inside air discharge port while outside air is taken into the cover 70 through the first cover opening 71 which is an outside air introduction port, so that ventilation property inside the cover 70 is excellent and hot air is less likely to be trapped. Therefore, it is easy to improve coolability of the fuel supply module 20 located in the cover 70.

(11) The cover 70 is provided with the gas sensor 75 that detects gas fuel.

As a result, gas leakage from the fuel supply module 20 is easily detected by the gas sensor 75.

(12) The fuel tank 21 is a cylindrical body extending in an elongated shape in the X direction, and a pair of the second attachment brackets 34 as an attachment portion are provided in portions located on both sides in the longitudinal direction of the fuel tank 21 with respect to the fuel tank 21 on the support 30.

As a result, since the fuel supply module 20 is provided with a pair of the second attachment brackets 34 as an attachment portion on both sides in the longitudinal direction of the fuel tank 21 which may be a largest and heaviest among components, the fuel supply module 20 can be easily attached to the irregular ground traveling vehicle 100 in a well-balanced manner.

(13) The support 30 includes the grounding portion 35a that is grounded so as to maintain a posture in which the fuel supply module 20 is mounted on the irregular ground traveling vehicle 100 as a single body.

As a result, it is possible to perform maintenance simulating a posture in which the fuel supply module 20 is mounted on the irregular ground traveling vehicle 100 even as a single body.

(14) The drive unit 5 is mounted below the fuel supply module 20.

As a result, increase in size in a direction perpendicular to the vertical direction of a device including the fuel supply module 20 and the drive unit 5 is suppressed. Further, detaching the fuel supply module 20 from the vehicle results in good maintenance workability of the drive unit 5.

(15) The base plate 61, which is a heat insulator, is located below the fuel tank 21.

As a result, the fuel tank 21 can be effectively shielded from hot air rising from the drive unit 5 by the base plate 61.

(16) The irregular ground traveling vehicle 100 further includes the cargo bed 10, and at least a part, that is, a −Y side end portion in the present embodiment, of the fuel supply module 20 is mounted on the bottom wall front portion 11a of the cargo bed 10.

As a result, it is easy to mount the fuel supply module 20 on the irregular ground traveling vehicle 100 while suppressing influence on the riding space R. As compared with a case where the fuel supply module is mounted on the irregular ground traveling vehicle 100 without the cargo bed 10, it is possible to reduce the number of changing portions for mounting the fuel supply module 20 on the irregular ground traveling vehicle 100.

In the above embodiment, the case where the fuel supply module 20 is mounted on the irregular ground traveling vehicle 100 is described as an example, but the present disclosure is not limited to this example. The fuel supply module 20 is also applicable to a vehicle other than an irregular ground traveling vehicle, and is also applicable to a vehicle other than a tracked vehicle such as a rail vehicle (for example, a construction machine), a ship (for example, a personal watercraft), and an aircraft (for example, a rotorcraft). Further, the fuel supply module 20 can also be applied to a fuel cell vehicle, and can also be applied to an unmanned traveling vehicle.

Further, the fuel supply module 20 may be configured not to be mounted on a vehicle. For example, the fuel supply module 20 may be configured as a device provided in an equipment installed in a device other than a vehicle, for example, a facility.

That is, another aspect of the present disclosure provides a fuel supply module including:
a fuel tank in which gas fuel supplied to a drive unit of a vehicle, or a an equipment installed in a house, a factory, and the like is stored;
a regulator that is connected to the fuel tank and adjusts the gas fuel output from the fuel tank to predetermined pressure;
a fuel output port through which the gas fuel adjusted by the regulator is output; and
a support that supports devices including the fuel tank, the regulator, and the fuel output port, and includes an attachment portion detachably attached to the vehicle or the equipment while supporting the devices.

What is claimed is:

1. A fuel supply module that supplies gas fuel to a drive unit of a vehicle, the fuel supply module comprising:
a fuel tank in which the gas fuel is stored;
a regulator that is connected to the fuel tank and adjusts the gas fuel output from the fuel tank to predetermined pressure;
a fuel output port through which the gas fuel adjusted by the regulator is output; and
a support that supports devices including the fuel tank, the regulator, and the fuel output port, and includes an attachment portion detachably attached to the vehicle while supporting the devices, wherein
the fuel supply module further includes
an electrical component that electronically controls operation of the fuel supply module, and
a module-side connector that electrically connects the electrical component to the vehicle, and
the electrical component and the module-side connector are supported by the support, and
the module-side connector is located on a side where the fuel output port is arranged with respect to the fuel tank.

2. A fuel supply module that supplies gas fuel to a drive unit of a vehicle, the fuel supply module comprising:
a fuel tank in which the gas fuel is stored;
a regulator that is connected to the fuel tank and adjusts the gas fuel output from the fuel tank to predetermined pressure;
a fuel output port through which the gas fuel adjusted by the regulator is output; and
a support that supports devices including the fuel tank, the regulator, and the fuel output port, and includes an attachment portion detachably attached to the vehicle while supporting the devices, wherein
the fuel supply module further includes a fuel filler connected to the fuel tank and to which the gas fuel is supplied, and
the fuel filler is located on a side opposite to the regulator with respect to the fuel tank.

3. A fuel supply module that supplies gas fuel to a drive unit of a vehicle, the fuel supply module comprising:
a fuel tank in which the gas fuel is stored;
a regulator that is connected to the fuel tank and adjusts the gas fuel output from the fuel tank to predetermined pressure;
a fuel output port through which the gas fuel adjusted by the regulator is output; and
a support that supports devices including the fuel tank, the regulator, and the fuel output port, and includes an attachment portion detachably attached to the vehicle while supporting the devices, wherein
the fuel tank includes a tank inlet and outlet port through which the gas fuel is supplied and/or output, and
the support includes a cover portion that covers the tank inlet and outlet port.

4. A vehicle driven by energy generated from a drive unit supplied with gas fuel, the vehicle comprising a fuel supply module including
a fuel tank in which the gas fuel is stored,
a regulator that is connected to the fuel tank and adjusts the gas fuel output from the fuel tank to predetermined pressure,
a fuel output port through which the gas fuel adjusted by the regulator is output, and a support that supports devices including the fuel tank, the regulator, and the fuel output port, and includes an attachment portion detachably attached to the vehicle while supporting the devices,
wherein the support includes a grounding portion that is grounded so as to maintain a posture in which the fuel supply module is mounted on the vehicle as a single body.

5. The vehicle according to claim 4, wherein the drive unit is mounted below the fuel supply module.

6. The vehicle according to claim 4, further comprising a cargo bed, wherein
at least a part of the fuel supply module is mounted on the cargo bed.

7. A fuel supply module that supplies gas fuel to a drive unit of a vehicle, the fuel supply module comprising:
a fuel tank in which the gas fuel is stored;
a regulator that is connected to the fuel tank and adjusts the gas fuel output from the fuel tank to predetermined pressure;
a fuel output port through which the gas fuel adjusted by the regulator is output; and
a support that supports devices including the fuel tank, the regulator, and the fuel output port, and includes an attachment portion detachably attached to the vehicle while supporting the devices,
wherein the support includes a grounding portion that is grounded so as to maintain a posture in which the fuel supply module is mounted on the vehicle as a single body.

8. The vehicle according to claim 4, wherein the fuel supply module further includes a heat insulator for a heat source around thereof.

9. The vehicle according to claim 8, wherein the heat insulator is away from the fuel tank.

10. The vehicle according to claim 4, wherein the fuel supply module further includes an electrical component that electronically controls operation of the fuel supply module, and a module-side connector that electrically connects the electrical component to the vehicle, and the electrical component and the module-side connector are supported by the support.

11. The vehicle according to claim 4, wherein the support includes an engaged portion to which a hook for lifting the support can be engaged.

12. The vehicle according to claim 4, wherein the fuel supply module further includes a cover covering the fuel supply module from above, and the cover is exposed to outside of the vehicle.

13. The vehicle according to claim 12, wherein the cover includes an outside air introduction port through which outside air is introduced into the cover, and an inside air discharge port for discharging inside air in the cover to the outside.

14. The vehicle according to claim 12, wherein the cover is provided with a gas sensor that detects gas fuel.

15. The vehicle according to claim 4, wherein the fuel tank is a cylindrical body extending in an elongated shape, and the attachment portion is provided in a portion located on both sides in a longitudinal direction of the fuel tank with respect to the fuel tank on the support.

16. The vehicle according to claim 8, wherein the heat insulator is located below the fuel tank.

* * * * *